United States Patent [19]

Martin et al.

[11] Patent Number: 5,009,697
[45] Date of Patent: Apr. 23, 1991

[54] LIQUID ORGANIC PEAT FERTILIZER AND PROCESS OF PREPARING SAME

[75] Inventors: Antonio M. Martin; Peter J. Scott, both of Newfoundland, Canada

[73] Assignee: Memorial University of Newfoundland, Canada

[21] Appl. No.: 127,161

[22] Filed: Dec. 1, 1987

[51] Int. Cl.$^5$ .................... C05F 11/02; C05F 11/04
[52] U.S. Cl. ........................ 71/24; 71/64.10; 44/490; 44/492
[58] Field of Search ............ 71/24, 64.10; 44/27, 44/33

[56] References Cited

U.S. PATENT DOCUMENTS 1,584,136  5/1926  Pease ............................. 71/24

FOREIGN PATENT DOCUMENTS 49-99849  9/1974  Japan ............................ 71/24

OTHER PUBLICATIONS

C. H. Fuchsman, "Peat: Industrial Chemistry and Technology", Academic Press (1980), pp. 12–15.

*Primary Examiner*—Ferris H. Lander
*Attorney, Agent, or Firm*—Ostrolenk, Faber, Gerb & Soffen

[57] ABSTRACT

A novel process has been provided for the preparation of both a liquid peat extract substantially-free from biologically-undesirable concentrations of metal elements and compounds, and a solid peat residue substantially-free from biologically-undesirable concentration of metal elements and compounds. The process includes the first step of having specifically-recited physical and chemical properties, to a relatively mild acid hydrolyzation reaction under sterile controlled conditions at superatmospheric pressure at a temperature above the boiling point of water to a maximum elevated temperature of about 130° C. for a time of from about 1 to about 2 hours in an inert container to provide a reacted medium comprising an aqueous liquid peat extract phase and a solid hydrolyzed peat phase dispersed therethrough. The pH of the reaction medium is then adjusted to near neutral. The neutralized reaction medium is removed from the inert container and is pressed and filtered in inert equipment. Both the liquid peat extract and the solid hydrolyzed peat residues are recovered. The liquid medium provides a peat extract which is substantially-free from biologically-undesirable concentrations of metal elements and compounds.

21 Claims, No Drawings

LIQUID ORGANIC PEAT FERTILIZER AND PROCESS OF PREPARING SAME

This invention relates to the production of liquid fertilizers from peat as well as to the utilization of the non-liquid residues of peat produced as a by-product.

At present, most liquid fertilizers are chemically formulated. This is costly and involves the importation of some of the components. Canadian peat resources rank amongst the richest in the world but there is practically no exploitation nor utilization of this fossil material as a fertilizer. Besides its possible use as a fuel, peat can be utilized as a raw material in chemical and biochemical processes. It is well known that the provision of a cheap, plentiful supply of nutrients for microbial processes is one of the primary problems in biotechnology-related productions.

The main constituents of peat are water (80-90%) and partially decomposed residues of dead plants. This decomposition is promoted by microorganisms which also decompose, further enhancing the peat composition.

The use of peat per se in agriculture and horticulture is widely spread. Peat-based fertilizers, e.g. peat-mineral ammonia and peat manure have been said to have improved the physico-chemical properties of the soil and to have enhanced its effective fertility and its agriculture crops. Peat has also long been used as a soil conditioner in gardening. In addition, it has been found that the application of biologically-active peat chemicals facilitated the growth of plants, shortened the period of their development and enhanced crops. It is recognized that peat, due to its complex organic composition, has numerous biologically-active substances. However, these substances are bonded and hydrolytic destruction of these bonds are needed in order to recover them in a water solution.

The decomposed residues of both plants and microorganisms in peat contain considerable amounts of physiologically active substances, e.g. humic acids, compounds with giberellin-like activity, aromatic aldehydes, organic acids, steroids, vitamins, albuminous products, amino acids and polypeptides. Humic acids do not occur in plants and it was though that the humic acids in peat were produced by microorganisms using the decaying matter. The growth stimulating effect of humic acids on plants is well-known. In general, the attempts to produce fertilizers derived from peat have been based on the properties of the humic acids fraction. The content of humic acids varies from 5% in slightly decomposed peat to 50% in highly decomposed peat. However, besides the humic acids fraction, the presence of other peat components with fertilizer-like action is known.

Peat has a very high absorptive capacity; 1 kg of the less decomposed Sphagnum peat can retain up to 30 kg of water, and 1 kg of the more decomposed low-moor peat can retain up to 5 kg of water. The technology required to use peat as a chemical feedstock or as a fuel is greatly affected by this high moisture content. The water in peat cannot be removed by mechanical means, e.g. pressure filtration, because of the hydrogen bonding structure of the peat. The thermal pretreatment method that facilitates mechanical dewatering of peat is generally known as "wet carbonization". As conducted in the past, such process involved heating wet peat to temperatures between 149° C. to 538° C., for up to 1 hour. During this wet carbonization, decarboxylation and dehydratization reactions occurred and the colloidal fraction of peat was disrupted, permitting mechanical dewatering of peat, which removed up to 50% of the water. The breakdown of this peat colloidal suspension was found to take place at temperatures above 180° C. The soluble peat solids from the wet carbonization process amounted to 12-14% of the dry weight of the peat; half of the solute was in the form of reducing carbohydrates.

A portion of the carbohydrate present in peat is in the form of cellulose. In the past, in order to increase the carbohydrate concentration in the liquid fraction extracted from peat, acid hydrolysis of peat, which breaks down the cellulose, was conducted. The acid hydrolysis of peat at temperatures above the boiling point of water has been found, in the past, to be successful in obtaining liquid peat extracts with dissolved biologically active substances. It was thought that the most successful hydrolysis was obtained with $H_2SO_4$. In the past, it was though, that for optimum carbohydrate yields, the preferred temperature range was 150°-180° C. for the hydrolysis with 0.5% $H_2SO_4$. It was taught that at 160° C., 1 hour of retention time was required. In the past, however, the emphasis in the acid hydrolysis of peat has been on the production of monosaccharides which could be utilized by microorganisms. In the past, it has also been suggested that non-metallic equipment be used in the production of peat extract for fermentation purposes.

Because humic acids are insoluble in acids, it was believed that the extracts obtained after acid hydrolysis would not contain the growth stimulators commonly associated with peat. However, it has been found that besides the carbohydrates, a number of organic substances, including humic acids are present in peat extracts. Nitrogen-containing compounds (from 7% to 24% of the total nitrogen present in the peat), including a large number of amino acids, steroids and 5 macroelements and 8 microelements are believed to be present in acid-catalyzed peat extracts. Even moderate amounts of heat can alter the chemical nature of the nitrogenous compounds in peat. The proportion of unhydrolyzable nitrogen compounds increases with the degree of peat decomposition.

Uses of peat moss for other than fuel and agricultural purpose appear to be minor despite the huge available reserves of this material. For agriculture purposes, peat moss is in widespread use as a soil conditioner, although per se it has substantially no food value for plants. Naturally occurring peat contains approximately 90% by weight of water. Drying it for use as a fuel or as a soil conditioner, as well as for convenience of packaging and transportation, is a major problem. Peat also contains a substantial amount of bitumens, waxes, and resins. Extraction of these substances using conventional methods of liquid-solid extraction procedures had heretofore been attempted but, from a practical point of view no economically feasible manner of utilizing the various components of peat has heretofore been produced.

For many years attention has, however, been devoted to the treatment of peat for the purpose of rendering it suitable as a manure. There have been many proposals to saturate the peat with ammoniacal liquors, or with ammonia absorbed from gas, but the desired effects have not been obtained because an excess of alkali was harmful to the useful bacteria in the soil and also was harmful to germinating seeds and other vegetation in the soil. Proposals have been made, also, to saturate the peat with ammonia and to fix the ammonia in the peat by means of sulphuric acid, thereby to form ammonium sulphate in the peat, but in such cases the function of the peat simply became that of a vehicle for the ammonium sulphate. Moreover, it was thought that the addition of mineral acids was not desirable. Other proposals have included: the production of humate of ammonia by treating peat with hot ammoniacal solution; the production of nitrifying bacteria by spraying heaps or beds of peat with ammoniacal solution containing the bacteria; and the subjection of peat or prepared peat to the action of micro-organisms, capable of producing ammonia.

Canadian Patent No. 141,346 patented Jun. 25, 1912 by C. S. Bash provided procedures for the preparation of fertilizers from naturally occurring materials, e.g. soluble rocks. The patent provided a process which included mixing phosphate rock, properly diluted sulphuric acid, and the wet muck or peat in its natural state all together in a suitable mechanical mixer. The mixture developed heat of 170° F. by chemical action. This mixture was allowed to stand for 48 hours during which time the acid also acted upon the peat and rendered the nitrogen therein more available as plant food. This mixture, subjected to the above chemically-produced heat left the peat or muck with only 30% of the water which it originally contained. The composition of acidulated rock and peat was then dried in any suitable mechanical drier after which it was ready for use. As a large amount of the water in the peat was eliminated by the chemically-produced heat developed in the acidulating process, a material saving of fuel was secured over the older process of drying the peat separately.

Canadian Patent No. 174,812 patented Jan. 30, 1917 by J. J. A. Dewhilley used two stage neutralization of peat, first with ammonia, and then with carbonate of lime. According to that patent, black or dark peat was treated with a relatively limited quantity of ammonia which was just sufficient for neutralizing the free acids, chief among which was humic acid, in the peat and for making the mass slightly alkaline. To the peat mass treated in this way a suitable percentage, usually between 5% and 20%, of carbonate of lime was added and mixed so as to be uniformly distributed throughout the mass. The preparation was then ready for application to the soil or ground to be fertilized or enriched.

Canadian Patent No. 252,055 patented Jul. 28, 1925 by J. B. Carpzow showed the production of manures by treating sea slimes with peat which had been retted by hydrolysis. The essential feature of that invention resided in the fact that sea-slimes or foul slimes containing natural colloidals and active silicates were rendered suitable for the production of a manure. For that purpose, the sea-slimes or foul slimes were treated with peat.

Candadian Patent No. 497,451 patented Nov. 3, 1953 by M. Gasperini et al provided a composition for improving clay soils. The composition included a humic substance having a high water absorbing power, impregnated with an acid solution of a ferric salt and dried in free air. The composition was acidified by adding sulphuric acid to the solution of the ferric salt, e.g. ferric alum, or ferric sulphate.

Canadian Patent No. 527,408 patented Jul. 10, 1956 by J. W. Watson provided a process of forming a product acting as a plant simulant and tonic-acting composition for soil conditioning. Such product was prepared by comminuting partially dried Sphagnum peat moss and intimately intermixing whale solubles with the peat moss. The whale solubles were formed by the following steps: cooking substantially the whole whale for several hours in steam pressure retorts during agitation thereof; separating the liquid portion from the solids; removing the oil from the liquid; and removing a substantial portion of the water from the liquid.

Canadian Patent No. 749,891 issued Jan. 3, 1967 to R. Abbe provided a process for the preparation of an organic soil conditioner from peat moss. The process involved treating the peat moss with an aqueous solution comprising at least one of calcium hydroxide, magnesium hydroxide or a mixture thereof which acted as a neutralizer or organic acids contained in the peat-moss and as a catalyst for splitting cyclic compounds. The resulting paste-like mixture was heated at elevated temperatures, i.e. 20° C.–14° C., e.g. 40°–80° C. under pressure in an autoclave. Organic acids, e.g. lignic and humic acid were thus converted to their seats. The heating time was reduced as the pressure was increased. For example, a heating time was required for ten hours, several hours or scores of minutes when 2,3 or 5 atmospheric pressures, respectively, were used.

Canadian Patent No. 964,886 issued Mar. 25, 1975 to M. M. J. Ruel et al provided a process for the treatment of peat moss for the production of useful products therefrom. The patented invention contemplated the extraction of bitumens, waxes and resins, from peat moss and the simultaneous agglomeration of the peat moss residue into balls or spheres suitable for improved handling and use as a soil conditioner. The process included the steps of first providing a mixture including peat moss particles in the form of a hydrophilic matrix and hydrophobic constituents dispersed therein. The mixture included a first liquid constituting a hydrophobic continuous phase in sufficient amounts to form a fluid slurry with the peat moss, and a second, aqueous, liquid which wetted the hydrophilic matrix preferentially relative to the first liquid. The second liquid was substantially immiscible with the first liquid. The mixture was agitated so that the first liquid leached at least part of the hydrophobic constituents, and simultaneously the second liquid wetted the hydrophilic matrix and agglomerated the leached particles into a multiplicity of substantially discrete pellets. The first liquid containing the hydrophobic constituents was then separated from the pellets and the pellets were then at least partially dried.

In spite of these proposals liquid peat fertilizers have not met with unqualified success in the marketplace. One reason is believed to be the propensity of the peat fertilizer to have biologically-inhibitory effects.

Accordingly, an object of one aspect of the present invention is to provide a liquid fertilizer which will improve the soil chemically, physically and bacteriologically and in which the beneficial action would be lasting or sustained.

An object of yet another aspect of this invention is the provision of such a liquid fertilizer which can be used as a chemical-additive-free organic fertilizer except for the chemicals utilized in pH adjustment.

An object of yet another aspect of this invention is the production, under mild temperature conditions, of liquid peat extracts to be employed as a plant fertilizer including the formulation of a liquid-peat-extract-based product as a fertilizer.

Another object of this invention is to teach an improved such process where the fertilizer produced has an enhanced effect.

An object of yet another aspect of this invention is the production of a solid peat residue which can be dried more easily than the original peat.

By one broad aspect of this invention, a process is provided for the preparation of both a liquid peat, extract substantially-free from biologically-undesirable concentrations of metal elements and compounds, and a solid peat residue substantially-free from biologically-undesirable concentration of metal elements and compounds, which process comprises: subjecting particles of high-moor, low-decomposed sphagnum-type peat which has a lower proportion of humic acids, a higher concentration of hydrolyzable nitrogen compounds, and a higher proportion of weakly-bound biologically-active substances than low-moor peat, more than about 50% of such particles having a diameter of about 250 $\mu$m or less, to a relatively mild acid hydrolyzation reaction under sterile controlled conditions at superatmospheric pressure at a temperature above the boiling point of water to a maximum elevated temperature of about 130° C. for a time of from about 1 to about 2 hours in an inert container, to provide a reacted medium comprising an aqueous liquid peat extract phase and a solid hydrolyzed peat phase dispersed therethrough; adjusting the pH of the reaction medium to about neutral; removing the neutralized reaction medium from the inert container; pressing and filtering the removed, neutralized reacted medium in inert equipment; and recovering both the liquid peat extract, and the solid hydrolyzed peat residue.

The hydrolyzation reaction may be carried out at superatmospheric pressure at a temperature above the boiling point of water. In one embodiment, the hydrolyzation reaction is carried out at a temperature of 121° C. at a pressure of 198.5 KPa. In another embodiment, the hydrolyzation process is carried out for 1-2 hours. The hydrolyzation reaction is preferably between a well-mixed peat/acid solution, and may be carried out in an autoclave or similar equipment, or in a glass or other non-metallic container inside the autoclave. The pH adjustment is preferably carried out with NH$_4$OH solution, thereby enriching the peat extract by increasing the nitrogen content.

It is preferred that the peat first be dried to a moisture content below 10% (v/v) before it is ground. Preferably, the peat is ground in a blender or in a mill.

The acid hydrolyzation reaction preferably is carried out with diluted H$_2$SO$_4$, e.g. a 1.5% (v/v) H$_2$SO$_4$ solution. The ratio of dried peat/acid solution is preferably 1:6.

The hydrolyzation reaction may also preferably include the steps of pressing and filtering the reaction medium in non-metallic equipment, and recovering both the solid residues [e.g. for use as fuel], and the liquid medium [e.g. for use as fertilizer]. The hydrolyzation reaction may further include the step of diluting the pH-adjusted liquid medium with water, e.g. by diluting 1 part of the pH-adjusted liquid medium with 99 parts water, thereby to provide a liquid fertilizer.

The hydrolyzation reaction may also include the step of drying the solid residue to a moisture content of 10% or less, e.g. at room temperature conditions of 20° C., and 50% relative humidity, without forced air circulation.

As well, a process is provided for the extraction of nutrients from peat for use as a plant fertilizer, which process comrises: first subjecting particles of high-moor, low-decomposed sphagnum-type peat which has a lower proportion of humic acids, a higher concentration of hydrolyzable nitrogen compounds, and a higher proportion of weakly-bound biologically-active substances than low-moor peat, more than 50% of the particles having a diameter of 250 $\mu$m or less, to a relatively mild acid hydrolyzation reaction at a maximum elevated temperature of 130° C. carried out for a maximum period of time of 2 hours, either in a metal-free container or in an inert container; adjusting the pH of the reaction medium to near neutral; and recovering, from the reaction medium, a liquid peat extract which is either substantially-free from biologically-undesirable concentration of metal elements or compounds or contains a maximum of only very small concentrations of metallic ions. In one embodiment, the above-described process is may be carried out in a stainless steel container, and the liquid peat extract which is recovered from the reaction medium contains a maximum of only very small concentrations of metallic ions.

By this invention, as well, a process is provided for the preparation of both a liquid peat extract substantially-free from biologically-undesirable concentrations of metal elements and compounds, and a solid peat residue substantially-free from biologically-undesirable concentrations of metal elements and compounds, which process comprises: subjecting particles of high-moor, low-decomposed sphagnum-type peat which has a lower proportion of humic acids, a higher concentration of hydrolyzable nitrogen compounds, and a higher proportion of weakly-bound biologically-active substances than low-moor peat, more than 50% of the particles having a diameter of about 250 $\mu$m or less, to a relatively mild acid hydrolyzation reaction under sterile controlled conditions at superatmospheric pressure at a temperature above the boiling point of water to a maximum elevated temperature of about 130° C. for a time of from about 1-2 hours in an inert container, to provide a reaction medium comprising an aqueous liquid peat extract phase and a solid hydrolyzed peat phase dispersed therethrough; subjecting diluted or undiluted such reaction medium containing the liquid peat extract to a fermentation process with *Scytalidium acidophilum* to provide a fermentation broth; removing the fermentation broth from the inert container; pressing and filtering the fermentation broth in inert equipment; and recovering both the liquid peat extract, and the solid hydrolyzed peat residue. That fermentation process preferably takes place at 25° C. at a pH of 2 in an aerated and agitated fermentor. The peat extract should be diluted 1:1 with distilled water prior to its use as a fermentation medium. It is preferred that the fermentation medium be supplemented with a source of N and P, e.g. with 0.3-0.5% yeast extract. The fermentation broth should also preferably be blended to form a homogenized mixture and should preferably be heated to deactivate microbial metabolism.

The fermentation process of this aspect of the invention is carried out on peat extract produced by the processes of the many variant described above, when carried out in non-metallic containers, as well as by processes described above when carried out in a stainless steel reactor, namely:

(a) These processes may be carried out at a maximum temperature of 130° C.;

(b) These processes may be carried out at superatmospheric pressure at a temperature above the boiling point of water;

(c) These processes may be carried out at a temperature of 121° C. at a pressure of 198.5 KPa;

(d) These reactions may be between a well-mixed peat and acid solution and should preferably be carried out in an autoclave or similar equipment or in a glass or other non-metallic container or in a stainless-steel container in an autoclave;

(e) The peat may first be dried to a moisture content below 10% (v/v), and then may be reduced in size by being ground in a blender or mill;

(f) The acid hydrolyzation reaction may be carried out with diluted $H_2SO_4$, e.g. where the $H_2SO_4$ is of 0-5–1.5% (v/v) concentration, preferably a 1.5% (v/v), $H_2SO_4$ solution;

(g) The ratio of dried peat/acid solution may be 1:6; and (h) The process may be carried out under sterile controlled conditions to provide a sterile liquid peat extract fertilizer.

After the reaction in the stainless steel container and/or the fermentation reaction, the peat extract may be subjected to the following further procedures, namely:

(a) These processes may include the steps of pressing and filtering the reaction medium either in inert equipment, e.g. stainless steel equipment or non-metallic equipment, and both the solid residues may be recovered [e.g. for use as fuel], and the liquid medium may be recovered [e.g. for use as fertilizer].

(b) The pH adjustment may be carried out with $NH_4OH$ solution, thereby enriching the liquid fertilizer by increasing the nitrogen content;

(c) The process may include the step of diluting the pH-adjusted liquid medium with water, e.g. by diluting 1 part of the pH-adjusted liquid medium with 99 parts water, thereby to provide a liquid fertilizer; and (d) After recovery of the solid residue, the drying step can take place at room temperature conditions of 20° C., and a relative humidity of 50%, without forced air circulation.

By another aspect of this invention, a liquid peat extract is provided which is substantially free from undesirable concentrations of metal elements and compounds provided by the acid hydrolyzation of peat in a metal-free environment relatively mild acid hydrolysis of peat under elevated temperatures according to the processes described above. The liquid peat extract is desirably rich in plant growth-stimulating products.

The liquid fertilizer preferably is one whose pH has been adjusted to near neutral with $NH_4OH$. Preferably the liquid peat extract is diluted with water, preferable to a concentration of 1% by volume i.e., 1 part of the pH-adjusted liquid medium diluted with 99 parts water, to provide a liquid a liquid fertilizer of a concentration which can be assimilated by plants. The liquid peat extract may also include additional nutrients added thereto to suit it specifically as a fertilizer for a specific crop, e.g. a fertilizer therein having high N, P and K values. The liquid peat extract may be in the form of a liquid nutrient solvent for solid fertilizers, for the spraying of plant foliage, or for hydroponic processes.

A dried solid peat residue is also provided according to an aspect of this invention by the relatively mild acid hydrolyzation of peat under elevated temperatures in a metal free environment. The residue preferably contains 66% humic substances, 25% cellulose and the balance minor constituents.

By another aspect of this invention, a liquid peat extract fertilizer is provided which contains a maximum of only trace concentrations of metal elements or compounds, such liquid peat extract being provided by the mild acid hydrolyzation of peat under elevated temperatures in a stainless steel container, according to the teachings of the process taught by the present Supplementary Disclosure.

The liquid peat fertilizer is preferably provided from such liquid peat extract by adjusting the pH of the liquid peat extracts to a desired level with $NH_4OH$. The liquid peat fertilizer preferably is provided from such liquid peat extracts by diluting the liquid peat extract with water, preferable to a concentration of 1% by volume i.e., 1 part of the pH-adjusted liquid medium diluted with 99 parts water, thereby to provide a liquid fertilizer.

By another aspect of this invention, a dried solid peat residue is recovered from the reaction medium of the relatively mild acid hydrolyzation of peat under elevated temperatures in a stainless steel container according to the procedure as described above.

The basis of the present invention is the discovery that, in the past, in the preparation of the peat extract, the contact of the acid solution of peat with metal surfaces or instruments resulted in the presence of biologically-undesirable concentrations of metal elements and compounds. Thus, the present invention provides a process for the acid hydrolysis of peat to provide a liquid peat fertilizer in a system which avoids any contact of the acid solution-peat particles mixture with metallic surfaces.

The complex composition of the peat is converted, by the process of aspects of this invention, into liquid extracts which contain growth activators and growth inhibitors. Dilution of the extracts produce the proper concentration of nutrients able to be assimilated by the living organisms and reduces or substantially eliminates the effects of the inhibitory substances.

It is believed that the liquid extract from the acid hydrolysis of peat prepared according to the process of aspects of this invention contains metabolic stimulating substances. In addition to the solubilizing effect of temperature and acid, it is believed that biologically-active substances are present in slightly decomposed peat either in free state or in a weakly-bonded state and that they can thus be recovered in water solution. However, in more decomposed peat these substances are bonded and to free them it was believed to be necessary to carry out an acid hydrolysis process on the peat raw material. Moreover such process does not remove the non-carbohydrate materials that are believed to be extremely valuable in promoting growth.

Moreover, the basis of the present invention is embodied in another discovery. As described above, the first discovery is that, because of the acid nature of the extraction process, non-metallic or stainless steel containers should be used. The non-metallic containers will guarantee a totally metal-free product which will not interfere with nutrient intake by plants with a lower sensitivity to the metallic ion concentrations. In the latter case, liquid peat extract fertilizers may be produced by stainless steel containers.

The other discovery was that fermenting the peat extract produced either in a metal free-environment or in a stainless steel container, with *Scytalidium acidophilum* enhanced the fertilizer effect of the peat extract.

The prior art is aware of the fact that the mycelia and the filtrate, after cultivation of several fungi, contain hormone-like substances which stimulate the growth of plants. The chemical composition of these substances is not completely known, but nevertheless, the prior art has suggested that those filtrates can be utilized as liquid fertilizer.

Thus, the invention provides diluted peat extracts from the chemical hydrolysis of peat which are useful as plant fertilizers. The peat extracts obtained have a chemical composition useful as a nutrient source for plants. This product is thus a natural substitute for chemically formulated fertilizers.

In addition, while the liquid peat fertilizer can be used per se, suitable formulation of peat extracts are provided by other aspects of this invention to be used as a plant fertilizer by suitable adjustment of component concentrations and by optional supplementation with specific required conventional components.

The use of organic fertilizers obtained from peat do not necessarily have the same objective as the use of many of the commercially-available plant fertilizers. The latter are, in general, formulated basically to add to the soil extra amounts of nitrogen (N), phosphorus (P) and potassium (K) to replace what is lost due to an intensive crop. On the other hand, the N, P, and K, contents of peat are low in comparison with the concentration of the same elements in commercial fertilizers. In addition, only a fraction of the peat exists in the liquid extract. Therefore, although a peat-based fertilizer will add some N, P, and K to the soil, the main value of the peat-based fertilizer will be the organic growth stimulating substances which have been found in peat. In the case of liquid peat fertilizers, the produce can be used by itself in promoting general growth and increasing plant productivity of specific crops, or as a supplementary organic nutrient source, in conjunction with fertilizers with high N, P, and K, for itensive crops with high requirement for these elements. It may also be employed as a liquid nutrient solvent for solid fertilizers, for the spraying of plant foiliage, or for hydroponic processes.

As far as a generalized description of the process of aspects of the invention is concerned, the initial step of the process is to extract nutrients from the peat utilizing a modified form of the general process of acid hydrolyzation, previously employed to produce peat extracts that were used as fermentation media. Characteristics of the process of aspects of this invention are as follows:

The peat should be the high-moor, low-decomposed Sphagnum type, which characteristically has a lower proportion of humic acids, a higher concentration of hydrolyzable nitrogen compounds, and higher proportion of weakly-bound biologically active substances than the more decomposed, low-moor peat.

To increase the interaction between the peat particles and the acid solution in the extraction process, the peat particles should be as small as possible. The peat particle size fraction with a diameter of 250 $\mu$m or less should preferably be increased to more than 50% of the total peat e.g., using a blender or a mill. It has been found to be necessary to dry the peat, e.g. by oven-drying, in order to facilitate the subsequent size reduction. This size reduction pretreatment is not essential in the carrying out of the peat hydrolysis reaction, but is preferred to improve the process. Moreover, wet peat may also be used to prepare peat extracts.

In carrying out the process, dried ground peat or wet peat was mixed with an acidic solution, e.g. of $H_2SO_4$. A wide range of peat: solution ratios and acid concentration can be used. It is preferred, however, to utilize a ratio of 1 part (by weight) of dry peat to 6 parts of acid solution. If wet peat is utilized, an equivalent ratio should preferable be employed. The acid concentration in the solution is preferably 1.5% v/v $H_2SO_4$ in distilled water.

All the operations after the acidification of the raw peat must be conducted in the substantial absence of metal, e.g. peat in contact with a metal surface is believed to produce increased concentrations of metal ions in the extracts, with subsequent inhibitory effects on plant growth. One means of achieving this is by conducting the process in a glass container inside an autoclave.

According to aspects of this invention, well-mixed peat/acid solution is subjected to a high temperature process using steam. In one embodiment of this process, a conventional autoclave was utilized. However the process may be conducted in equipment which would stir the peat/acid mixture during the thermal process to provide in an enhanced extraction. Alternatively, the hydrolyzation procedure may be conducted as a continuous process.

The temperature and time of the hydrolysis process are two important operating variables. This process is different from the prior art, which was wet-carbonization processes carried out at a temperature of at least 150° C. This process is also different from the prior art extraction of nutrients for fermentation media, where 130° C. had been the lowest temperature applied. On the other hand, in one embodiment of this invention, 121° C. was the temperature chosen because it was believed that higher-temperature could cause greater degradation of the organic substances present. In fact, it is preferred that the maximum temperature be 130° C. In addition, the extraction of most of the soluble organic nutrients in peat is believed to require milder conditions than those required for the cellulose hydrolysate. Obtaining 121° C. in the autoclave was achieved at a pressure 198.5 KPa. A time range between 1 to 2 hours will be effective for the process of aspects of this invention.

It is observed that these conditions are normally employed in the sterilization processes, and consequently provide the preferred sterile peat extract.

After the hydrolyzation process, the acid-peat solution should be pressed in a conventional manner. Different pressures will result in different liquid yields. The liquid fraction of the peat extract should be filtered to eliminate any suspended solids.

The pH of the liquid peat extract is adjusted with $NH_4OH$ solution to the desired pH level for the crop. The initial pH of the peat extract is very low, i.e. is approximately 1.5. Therefore, the adjustment of the pH to a neutral or near neutral pH values with $NH_4OH$ will enrich the peat extract by increasing the nitrogen content.

The pH adjusted peat extract should be maintained in an aseptic a condition as possible to avoid microbial contamination. Otherwise, the pH adjustment should be conducted before fertilization, when the extract is diluted to the concentration required by the crop.

The wet residual solid fraction from the liquid extraction process contained approximately 40 to 70% moisture just after the hydrolysis. Left to dry at room temperature conditions (approximately 20° C., 50% relative humidity), without forced air circulation, slabs of approximately 2.5 cm thick dry in approximately 7 to 10 days to what appears to be the equilibrium moisture content of the product, which is less than 10% moisture. The residue from a sulphuric acid hydrolysis of a metric ton of peat (dry basis) is estimated to be 900–1000 kg, of which 40% is moisture. The residue contains approximately 66% humic substances, 25% cellulose and the balance other minor constituents. This solid residue could be used as fuel, or as a raw material in several processes, including the production of coke for the steel industry.

The drying characteristics of the solid residue obtained in the process of aspects of this invention are such that at temperatures much lower than those reported for the wet carbonization process, the peat solid residue dried without any specific drying treatment, to moisture levels lower than those previously reported for the drying of the peat residue after the wet carbonization process. It is therefore believed that in the present process, the colloidal structure of peat and the hydrogen bonds present which retain moisture, are affected at least as much as they are when harsh conditions, specifically higher temperatures, are applied.

Research has been conducted in the growth of the acid-resistant fungus *S. acidophilum* in peat extracts. It has been found to be convenient to grow *S. acidophilum* in peat extract. Firstly there is practically no need to adjust the original low pH of the peat extract (which is approximately 1.5) to the growth pH of this fungus (approximately 1.5–2.0). In addition, the requirements for aseptic operation are minimal, because few microorganisms are able to grow at this range.

The following are Examples of processes of extracting nutrients from peat and thereby producing a liquid peat fertilizer.

EXAMPLE 1

Sphagnum peat moss with approximately 70% moisture content is dried to a moisture content below 10% (v/v). The dried peat is ground, the resulting product having a composition of more than 50% of particles with a diameter of 250 μm or less. The dried ground peat is mixed with 1.5% (v/v) $H_2SO_4$ solution (1 part dry peat to 6 parts of acid solution) and autoclaved at 121° C. (198.5 KPa) for 2 hours. The resulting product is pressed and filtered. All the operations should be conducted utilizing metal-free containers and equipment. The liquid fraction pH is adjusted with concentrated $NH_4OH$ to the desired pH level. The product should be diluted 100 times with water to obtain the appropriate concentration to be utilized as a fertilizer.

The solid residue can be dried for later use.

EXAMPLE 2

The process of fermentation takes place on the liquid peat extract produced in Example 1 at 25° C., pH 2.0, in an aerated and agitated fermentor. The best growth occurs when the peat extract is diluted 1:1 with distilled water and is supplemented with between 0.3 and 0.5% yeast extract or other sources of N and P. After fermentation, the fermented peat extract plus the mycelium is blended to homogenize the broth and is heated to deactivate the metabolism. Afterwards, the resulting mycelium is treated in the same way as the non-fermented peat extract, to be used as a liquid organic fertilizer with pH adjustment; dilution; and nutrient supplementation, if needed.

TEST 1

In one test of the liquid peat organic fertilizer of the process of aspects of this invention conducted in the growth of plants in a soilless mixture of peat:perlite:vermiculite (1:1:1, plus lime), the peat extract was diluted 100 times with water (1% peat extract) and was utilized as a fertilizer. This produced results equal to those obtained with RX-15, a commercial chemical fertilizer. Non-diluted peat extract and even a 5% peat extract produced inferior growth results than the 1% peat extract.

The present invention therefore provides a process which utilizes the scientific and technical background existing to dewater peat by the "wet carbonization" process and to extract nutrients from peat by the acid hydrolysis of peat. However, the process of aspects of this invention is conducted at milder operating conditions than in the aforementioned processes, and is able to extract growth stimulating substances which have been proved useful in aiding the growth of plants. The liquid peat-based fertilizer is a new product based on the liquid fraction extracted from peat. The main difference in the peat fertilizer produced according to aspects of the present invention compared to prior art peat-based fertilizers, which are mostly solids, is that it is not based on the humic fraction of the peat.

We claim:

1. A process for the preparation of both a liquid peat extract substantially-free from biologically-undesirable concentrations of metal elements and compounds, and a solid peat residue substantially-free from biologically-undesirable concentration of metal elements and compounds, which process comprises:

subjecting particles of high-moor, low-decomposed sphagnum-type peat which has a lower proportion of humic acids, a higher concentration of hydrolyzable nitrogen compounds, and a higher proportion of weakly-bound biologically-active substances than low-moor peat, more than about 50% of said particles having a diameter of about 250 μm or less, to a relatively mild acid hydrolyzation reaction under sterile controlled conditions at superatmospheric pressure at a temperature above the boiling point of water to a maximum elevated temperature of about 130° C. for a time of from about 1 to about 2 hours in an inert container, to provide a reacted medium comprising an aqueous liquid peat extract phase and a solid hydrolyzed peat phase dispersed therethrough;

adjusting the pH of the reaction medium to about neutral;

removing said neutralized reaction medium from said inert container;

pressing and filtering said removed, neutralized reacted medium in inert equipment; and recovering both said liquid peat extract, and said solid hydrolyzed peat residue.

2. The process of claim 1 wherein said hydrolyzation reaction is carried out at a temperature of about 121° C. at a pressure of about 198.5 KPa.

3. The process of claim 1 wherein said inert container is a glass container or a stainless steel container, and wherein said superatmospheric pressure is provided by an autoclave.

4. The process of claim 1 wherein said peat is first dried to a moisture content below about 10% by weight.

5. The process of claim 1 wherein said hydrolyzation reaction is carried out with diluted $H_2SO_4$.

6. The process of claim 4 wherein said hydrolyzation reaction is carried out by way of a mixture of about 1 part by weight of peat to about 6 parts by weight of diluted $H_2SO_4$.

7. The process of claim 6 wherein said pH adjustment is carried out with $NH_4OH$ solution, thereby to enrich said peat extract by increasing the nitrogen content thereof.

8. The process of claim 7 including the step of diluting about 1 part of the said pH-adjusted, recovered liquid peat extract with up to about 99 parts of water, thereby to provide a liquid fertilizer.

9. The process of claim 7 including the step of drying the recovered solid residue to a moisture content of about 10% or less, thereby to provide a fuel.

10. A process for the preparation of both a liquid peat extract substantially-free from biologically-undesirable concentrations of metal elements and compounds, and a solid peat residue substantially-free from biologically-undesirable concentrations of metal elements and compounds, which process comprises:

subjecting particles of high-moor, low-decomposed sphagnum-type peat which has a lower proportion of humic acids, a higher concentration of hydrolyzable nitrogen compounds, and a higher proportion of weakly-bound biologically-active substances than low-moor peat, more than about 50% of said particles having a diameter of about 250 μm or less, to a relatively mild acid hydrolyzation reaction under sterile controlled conditions at superatmospheric pressure at a temperature above the boiling point of water to a maximum elevated temperature of about 130° C. for a time of from about 1 to about 2 hours in an inert container, to provide a reaction medium comprising an aqueous liquid peat extract phase and a solid hydrolyzed peat phase dispersed therethrough;

subjecting diluted or undiluted said reaction medium containing said liquid peat extract to a fermentation process with *Scytalidium acidophilum* to provide a fermentation broth;

removing said fermentation broth from said inert container;

pressing and filtering said fermentation broth in inert equipment; and recovering both said liquid peat extract, and said solid hydrolyzed peat residue.

11. The process of claim 10 wherein said fermentation process takes place at a temperature of about 25° C. at a pH of about 2 in an aerated and agitated fermentator.

12. The process of claim 10 wherein said fermentation medium is supplemented with a source of N and P, or with about 0.3 to about 0.5% by weight of yeast extract.

13. The process of claim 10 wherein said recovery step is preceded by the steps of: blending said fermentation broth to form a homogenized mixture; and heating said homogenized mixture to deactivate microbial metabolism.

14. The process of claim 10 wherein said hydrolyzation reaction is carried out at a temperature of about 121° C. at a pressure of about 198.5 KPa.

15. The process of claim 10 wherein said peat is first dried to a moisture content below about 10% by weight.

16. The process of claim 10 wherein said hydrolyzation reaction is carried out with diluted $H_2SO_4$.

17. The process of claim 10 wherein said inert container is a glass container or a stainless steel container, and wherein said superatmospheric pressure is provided by an autoclave.

18. The process of claim 10 wherein said hydrolyzation reaction is carried out between a mixture about 1 part by weight of peat to about 6 parts by weight of diluted $H_2SO_4$.

19. The process of claim 18 wherein said pH adjustment is carried out with $NH_4OH$ solution, thereby to enrich said liquid peat extract by increasing the nitrogen content therein.

20. The process of claim 19 including the step of diluting about 1 part of said recovered liquid peat extract with up to about 99 parts of water, thereby to provide a liquid fertilizer.

21. The process of claim 19 including the step of drying the recovered solid residue fermentation broth to a moisture content of about 10% or less, thereby to provide a fuel.

* * * * *